(12) United States Patent
Yoshioka et al.

(10) Patent No.: US 8,863,498 B2
(45) Date of Patent: Oct. 21, 2014

(54) EXHAUST GAS PURIFICATION APPARATUS OF AN INTERNAL COMBUSTION ENGINE

(75) Inventors: Mamoru Yoshioka, Susono (JP); Noriaki Kumagai, Susono (JP); Naoya Takagi, Mishima (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 333 days.

(21) Appl. No.: 13/122,089

(22) PCT Filed: Jul. 15, 2010

(86) PCT No.: PCT/JP2010/062001
§ 371 (c)(1),
(2), (4) Date: Mar. 31, 2011

(87) PCT Pub. No.: WO2012/008038
PCT Pub. Date: Jan. 19, 2012

(65) Prior Publication Data
US 2012/0131907 A1    May 31, 2012

(51) Int. Cl.
*F01N 3/00* (2006.01)
*F01N 3/20* (2006.01)
*F01N 13/00* (2010.01)
*F01N 3/32* (2006.01)
*F01N 3/28* (2006.01)

(52) U.S. Cl.
CPC ............ *F01N 13/008* (2013.01); *F01N 3/2013* (2013.01); *F01N 3/2026* (2013.01); *F01N 2240/16* (2013.01); *F01N 2330/06* (2013.01); *F01N 2470/08* (2013.01); *Y02T 10/26* (2013.01); *F01N 3/323* (2013.01); *F01N 3/2853* (2013.01)

USPC .............. 60/276; 60/300; 60/303; 60/309

(58) Field of Classification Search
USPC .............. 60/284, 300, 309; 422/174, 179
See application file for complete search history.

(56) References Cited

U.S. PATENT DOCUMENTS 5,094,074 A      3/1992   Nishizawa et al.
5,140,812 A  *  8/1992   Cornelison et al. ............. 60/300
(Continued)

FOREIGN PATENT DOCUMENTS

JP          04-171214 A      6/1992
JP          05-269387 A     10/1993
JP           05269387 A  *  10/1993    .............. B01J 35/04

*Primary Examiner* — Jesse Bogue
*Assistant Examiner* — Matthew T Largi
(74) *Attorney, Agent, or Firm* — Sughrue Mion, PLLC

(57) ABSTRACT

The present invention has for its subject to avoid a situation that condensed water stays around electrode terminals, in an electric heating type exhaust gas purification apparatus which is arranged in an exhaust system of an internal combustion engine. In order to solve this subject, the present invention resides in an exhaust gas purification apparatus of an internal combustion engine which is provided with a catalyst carrier having electrodes, a case in which the catalyst carrier is accommodated, a mat member arranged between the catalyst carrier and the case, a space part extending from the catalyst carrier to the case while passing through the mat member, and electrode terminals accommodated in said space part for supplying electric power to the electrodes of the catalyst carrier, wherein exhaust gas and condensed water are kept from permeating into the space part through the mat member or the catalyst carrier, by the provision of a pressure supply unit which supplies a positive pressure to the space part.

5 Claims, 7 Drawing Sheets

(56) References Cited

U.S. PATENT DOCUMENTS

| | | | |
|---|---|---|---|
| 5,224,335 A * | 7/1993 | Yoshizaki | 60/300 |
| 5,554,342 A * | 9/1996 | Hirayama et al. | 422/174 |
| 6,112,519 A * | 9/2000 | Shimasaki et al. | 60/300 |
| 6,637,194 B2 * | 10/2003 | Kakuyama et al. | 60/285 |
| 7,341,699 B2 * | 3/2008 | Thieman et al. | 422/177 |
| 7,987,935 B2 * | 8/2011 | Ichimoto | 180/65.28 |
| 2006/0130463 A1 * | 6/2006 | Miura | 60/289 |
| 2010/0146954 A1 * | 6/2010 | Sloss et al. | 60/320 |
| 2012/0011834 A1 * | 1/2012 | Sobue | 60/300 |

\* cited by examiner

EXHAUST GAS PURIFICATION APPARATUS OF AN INTERNAL COMBUSTION ENGINE

TECHNICAL FIELD

The present invention relates to an electric heating type exhaust gas purification apparatus which is arranged in an exhaust passage of an internal combustion engine and is heated by electrical energization thereof.

BACKGROUND ART

As an electric heating type exhaust gas purification apparatus, there has been known one which is provided with a catalyst carrier, a shell (case) that receives the catalyst carrier, a mat member that is arranged between the catalyst carrier and the shell, a pair of electrodes that are arranged on a surface of the catalyst carrier, and a pair of electrode terminals that extend from the corresponding individual electrodes to the outside of the shell while passing through the mat member (see, for example, a first patent document). In such an exhaust gas purification apparatus, when a voltage is applied between the pair of electrode terminals, the catalyst carrier becomes an electrical resistance, thereby generating heat. As a result, a catalyst supported by the catalyst carrier is raised in its temperature.

PRIOR ART DOCUMENTS

Patent Documents

Patent Document 1: Japanese patent application laid-open No. H05-269387

DISCLOSURE OF THE INVENTION

Problem to be Solved by the Invention

On the other hand, in cases where the mat member is formed of an inorganic fiber such as an alumina fiber, or in cases where the catalyst carrier is formed of a porous material such as ceramic, there is a possibility that a small amount of exhaust gas may pass through the mat member or the catalyst carrier to permeate into an accommodation space (a penetration part in the mat member) for the electrode terminals.

Because the exhaust gas of an internal combustion engine has moisture ($H_2O$) contained therein, when the temperature of the accommodation space is low, the moisture in the exhaust gas is condensed into water, which stays in the accommodation space. Here, note that when a short trip operation with a short period of time form the start until the stop of operation of the internal combustion engine is repeated, a lot of condensed water may be accumulated in the accommodation space. In addition, the condensed water staying in the mat member or the catalyst carrier may permeate into and accumulate in the accommodation space.

When the temperature of the accommodation space rises in a state where a lot of condensed water exists in the accommodation space, the condensed water evaporates and the humidity in the accommodation space becomes high. As a result, the insulation resistance between the electrodes and the metal shell may decrease, so that the metal shell and the electrodes may be short-circuited to each other.

The present invention has been made in view of the actual circumstances as referred to above, and has for its object to provide a technique of avoiding a situation where condensed water stays around electrode terminals, in an exhaust gas purification apparatus of an internal combustion engine.

Means for Solving the Problem

In order to solve the above-mentioned problems, the present invention proposes to increase the pressure of a space in which electrode terminals are accommodated, thereby preventing exhaust gas and condensed water from permeating into the accommodation space, in an exhaust gas purification apparatus of an internal combustion engine.

Specifically, the present invention is provided with, in an exhaust gas purification apparatus of an internal combustion engine, a catalyst carrier that has electrodes, a case that has said catalyst carrier accommodated therein, a mat member that is arranged between said catalyst carrier and said case, a space part that extends from said catalyst carrier to said case while passing through said mat member, electrode terminals that are accommodated in said space part for supplying electric power to the electrodes of said catalyst carrier, and a pressure supply unit that supplies a positive pressure to said space part.

According to this invention, when a positive pressure is applied from the pressure supply unit to the space part, the pressure of the space part is made equal to or higher than the pressure of the exhaust gas which flows through the interior of the case. For that reason, the exhaust gas which flows through the interior of the case does not permeate into the space part through the mat member or the catalyst carrier. Further, the condensed water which is staying in the mat member or the catalyst carrier also does not permeate into the space part. Therefore, it becomes possible to avoid a situation that the condensed water stays in the space part. When the condensed water does not stay in the space part, a reduction of the insulation resistance between the electrodes of the catalyst carrier and the case is suppressed. As a result, it is possible to avoid a short circuit between the catalyst carrier (the electrodes) and the case is avoidable.

The exhaust gas purification apparatus of an internal combustion engine according to the present invention may be provided with an acquisition unit that acquires a physical quantity correlated with a temperature of the space part, a control unit that controls to apply pressure from the pressure supply unit to the space part when the temperature acquired by the acquisition unit is equal to or lower than a dew point temperature.

According to such a construction, when the temperature of the space part is higher than the dew point temperature, the application of the positive pressure by the pressure supply unit is stopped. When the temperature of the space part is higher than the dew point temperature, even if the exhaust gas permeates into the space part, moisture in the exhaust gas does not condense. Therefore, when the temperature of the space part is higher than the dew point temperature, even if the application of the positive pressure from the pressure supply unit to the space part is stopped, condensed water is not accumulated in the space part.

On the other hand, when the exhaust gas permeates into the space part during the time the temperature of the space part is lower than the dew point temperature, moisture in the exhaust gas condenses and stays in the space part. Moreover, the condensed water which has permeated into the space part from the mat member or the catalyst carrier may accumulate in the space part. However, when a positive pressure is applied from the pressure supply unit to the space part during the time the temperature of the space part is equal to or lower than the dew point temperature, the exhaust gas and condensed water stops permeating into the space part. As a result, it becomes possible to avoid the situation that the condensed water stays in the space part.

Accordingly, it becomes possible to avoid the situation where the condensed water stays in the space part, without operating the pressure supply unit in an unnecessary manner. At that time, in cases where a pump mechanism is used as the pressure supply unit, it is possible to suppress the deterioration of specific fuel consumption and the reduction in the durability of the pump mechanism accompanying the operation of the pump mechanism.

The exhaust gas purification apparatus of an internal combustion engine according to the present invention may be further provided with: an oxygen concentration sensor (or an air fuel ratio sensor) that is arranged on an exhaust passage at a downstream side of the catalyst carrier; a calculation unit that calculates a control parameter of the internal combustion engine by using an output signal of said oxygen concentration sensor; and a prohibition unit that prohibits the calculation of said control parameter by said calculation unit when a positive pressure is applied from said pressure supply unit to said space part.

When a positive pressure is applied from the pressure supply unit to the space part, a part of the gas (air) supplied to the space part may pass through the mat member and the catalyst carrier, so that it may mix into the exhaust gas. In that case, the oxygen concentration (or air fuel ratio) of the exhaust gas at the downstream of the catalyst carrier goes up (changes to a lean side) higher than the oxygen concentration (or air fuel ratio) of the exhaust gas at the upstream of the catalyst carrier. Therefore, when the control parameter is calculated by the use of the output signal of said sensor, the control parameter thus calculated may become an inappropriate value for an operating state of the internal combustion engine.

However, when the calculation processing of the control parameter using the output signal of said sensor is prohibited during the time the positive pressure is applied from the pressure supply unit to the space part, it is possible to avoid the situation where the control parameter becomes an inappropriate value for the operating state of the internal combustion engine, as well as the situation where the internal combustion engine is controlled by the inappropriate control parameter. Here, note that the prohibition unit may correct the output signal of said sensor to a value of a rich side, instead of prohibiting the calculation of the control parameter using the output signal of said sensor.

The "control parameter" as referred to herein is, for example, a correction value, a learning value, or the like, which is calculated according to sub feedback control, in an internal combustion engine which performs air fuel ratio feedback control (main feedback control) in which an amount of fuel to be injected is corrected based on an output signal of an oxygen concentration sensor (or air fuel ratio sensor) arranged on the exhaust passage at an upstream side of the catalyst carrier, and the sub feedback control in which the correction value or the learning value used for the air fuel ratio feedback control is calculated based on the output signal of the oxygen concentration sensor (or air fuel ratio sensor) at the downstream side of the catalyst carrier.

Here, note that the situation where the output signal of the above-mentioned sensor shifts to the lean side occurs when the pressure of the space part becomes higher than the exhaust gas pressure inside the case. Therefore, if the pressure of the space part is suppressed to be substantially equivalent to the pressure inside the case, it will become possible to avoid the situation where the output signal of the above-mentioned sensor shifts to the lean side.

Accordingly, the pressure supply unit may supply a pressure equivalent to the exhaust gas pressure inside the case to the space part. In that case, the pressure of the space part becomes equivalent to the exhaust gas pressure inside the case, so it is possible to avoid the situation where a part of the gas (air) supplied to the space part mixes into the exhaust gas. As a result, even in cases where the positive pressure is applied from the pressure supply unit to the space part, it becomes possible to carry out the calculation processing of the control parameter by means of the above-mentioned calculation unit.

Here, note that the exhaust gas pressure inside the case is correlated with the amount of intake air in the internal combustion engine. That is, the exhaust gas pressure inside the case becomes higher when the amount of intake air in the internal combustion engine is large than when the amount of intake air in the internal combustion engine is small. Therefore, the pressure supply unit may decide the pressure supplied to said space part by using as a parameter the amount of intake air in the internal combustion engine. For example, the pressure supply unit may make the pressure supplied to the space part higher when the amount of intake air in the internal combustion engine is large than when the amount of intake air in the internal combustion engine is small. Here, note that the amount of intake air in the internal combustion engine is able to be detected by an existing sensor such as an air flow meter, etc., it is possible to decide the pressure supplied to the space part without the addition of a dedicated sensor.

The exhaust gas purification apparatus of an internal combustion engine according to the present invention is also suitable in cases where a laminated body composed of a mat member, an electrical insulation layer and a mat member is arranged between the case and the catalyst carrier. In such a construction, condensed water is liable to stay in the mat member between the electrical insulation layer and the case, and in the mat member between the electrical insulation layer and the catalyst carrier, as compared with a construction in which only a mat member is arranged between the case and the catalyst carrier. Therefore, a lot of condensed water is liable to accumulate in the space part in which electrode terminals are accommodated. However, when the positive pressure is applied from the pressure supply unit to the space part, the condensed water stops permeating into the space part from the mat member between the electrical insulation layer and the case, and from the mat member between the electrical insulation layer and the catalyst carrier. Accordingly, even in cases where the laminated body composed of the mat member, the electrical insulation layer and the mat member is arranged between the case and the catalyst carrier, it is possible to avoid the situation where the condensed water stays in the space part.

Effects of the Invention

The present invention can avoid a situation where condensed water stays around electrode terminals, in an electric heating type exhaust gas purification apparatus.

THE BEST MODE FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

(First Embodiment)

Figure 1:
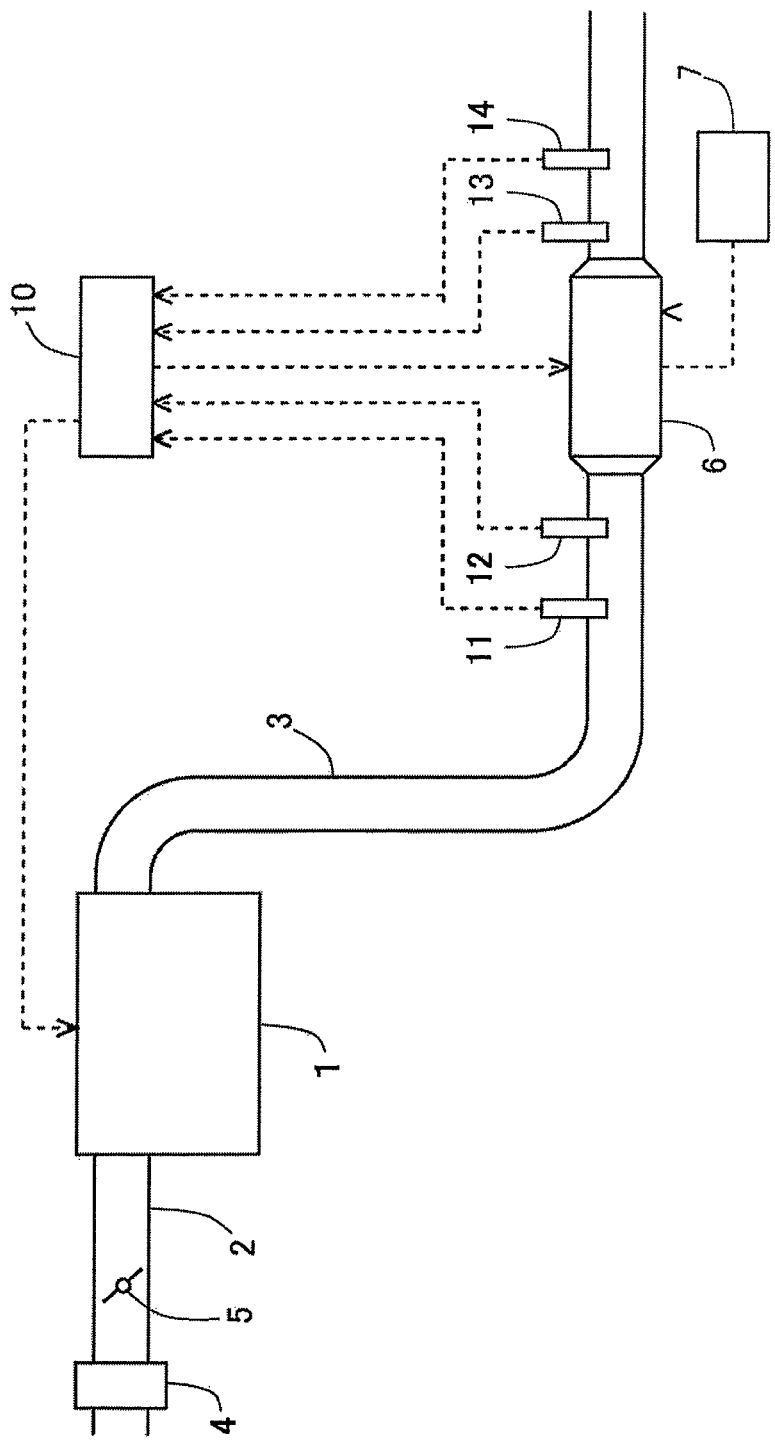
FIG. 1 is a view showing the schematic construction of intake and exhaust systems of an internal combustion engine to which the present invention is applied.

First, reference will be made to a first embodiment of the present invention based on FIGS. 1 through 3. FIG. 1 is a view showing the schematic construction of intake and exhaust systems of an internal combustion engine to which the present invention is applied.

An internal combustion engine 1 shown in FIG. 1 is a compression ignition type internal combustion engine (diesel engine) or a spark ignition type internal combustion engine (gasoline engine). An intake passage and an exhaust passage 3 are connected to the internal combustion engine 1.

On the intake passage 2, there are arranged an air flow meter 4 and an intake throttle valve 5. The air flow meter 4 is a sensor that outputs an electrical signal which is correlated with an amount of fresh air (air) flowing through the intake passage 2. The intake throttle valve 5 is a valve mechanism that changes the amount of intake air in the internal combustion engine 1 by changing the passage cross sectional area of the intake passage 2.

On the exhaust passage 3, there is arranged an electric heating type exhaust gas cleaning or purification apparatus (EHC) 6. The EHC 6 is an exhaust gas cleaning or purification apparatus including a heat generation element which generates heat at the time when electric power from a battery 7 is applied thereto. The detailed construction of this EHC 6 will be described later.

An air fuel ratio sensor 11 and an upstream side temperature sensor 12 are arranged on the exhaust passage 3 at the upstream side of the EHC 6. An $O_2$ sensor 13 and a downstream side temperature sensor 14 are arranged on the exhaust passage 3 at the downstream side of the EHC 6. The air fuel ratio sensor 11 is a sensor that outputs an electrical signal which is correlated with an air fuel ratio of an exhaust gas. The upstream side and downstream side temperature sensors 12, 14 are each a sensor that outputs an electrical signal which is correlated with the temperature of the exhaust gas. The $O_2$ sensor 13 is a sensor that outputs an electrical signal which is correlated with a concentration of oxygen in the exhaust gas.

In the internal combustion engine 1, there is arranged in combination therewith an electronic control unit (ECU) 10 for controlling the internal combustion engine 1. The ECU 10 is electrically connected to a variety of kinds of sensors such as the air flow meter 4, the air fuel ratio sensor 11, the upstream side temperature sensor 12, the $O_2$ sensor 13, and the downstream side temperature sensor 14. Moreover, the ECU 10 is electrically connected to a variety of kinds of equipment such as the intake throttle valve 5, the EHC 6, and fuel injection valves (not shown). The EHC 6 controls the above-mentioned variety of kinds of equipment based on the output signals of the above-mentioned variety of kinds of sensors.

Next, the construction of the EHC 6 according to this embodiment will be explained based on FIG. 2. FIG. 2 is a cross sectional view showing the schematic construction of the EHC 6. The EHC 6 is provided with a catalyst carrier 61, a case 62, and a mat member 63. The catalyst carrier 61, the case 62, and the mat member 63 are arranged coaxially with one another.

The catalyst carrier 61 is a honeycomb structured body which is formed into a circular cylindrical shape, and the honeycomb structured body is formed of a porous ceramic (e.g., SiC). On the catalyst carrier 61, there is carried or supported an oxidation catalyst, a three-way catalyst, a $NO_x$ storage reduction catalyst, a $NO_x$ selective reduction catalyst, or the like. In addition, a pair of electrodes 61a, 61b are arranged on an outer peripheral surface of the catalyst carrier 61. These electrodes 61a, 61b are arranged on the outer peripheral surface of the catalyst carrier 61 at locations opposite to each other.

The case 62 is a housing made of metal (e.g., stainless steel material) which accommodates the catalyst carrier 61, and is formed into a circular cylindrical shape which has an inside diameter larger than an outside diameter of the catalyst carrier 61. Here, note that the case 62 has an upstream side end and a downstream side end each formed into a tapered shape which becomes smaller in diameter in accordance with the increasing distance thereof from the catalyst carrier 61.

The mat member 63 is an annular member that is press fitted in between the outer peripheral surface of the catalyst carrier 61 and the inner peripheral surface of the case 62. The mat member 63 is formed of a material of low electrical conductivity (e.g., an inorganic fiber such as alumina fiber), and serves to support (hold) the catalyst carrier 61, while suppressing a short circuit between the case 62 and the catalyst carrier 61 (the electrodes 61a, 61b).

In those portions of the mat member 63 which face the electrodes 61a, 61b, there are formed through-holes 63a, 63b, respectively, which extend from the electrodes 61a, 61b to the case 62. The electrode terminals 64a, 64b for supplying electric power to the electrodes 61a, 61b respectively, are accommodated in these through-holes 63a, 63b respectively. The electrodes 61a, 61b have their base ends connected to the electrodes 61a, 61b. The electrodes 61a, 61b have their terminal ends penetrating through the case 62 to protrude to the outside of the case 62. Here, note that the through-holes 63a, 63b correspond to a space part according to the present invention.

Here, note that in those portions of the case 62 through which the electrode terminals 64a, 64b penetrate, support members 65 are interposed between the case 62 and the electrode terminals 64a, 64b, respectively. The support members 65 are each formed of an insulating material with low electrical conductivity, and serve to prevent the electrode terminals 64a, 64b and the case 62 from being short-circuited to each other. Further, the support members 65 and the electrode terminals 64a, 64b are joined to each other in an airtight manner, and at the same time, the case 62 and the support members 65 are also joined to each other in an airtight manner.

In the EHC 6 as constructed in this manner, when a voltage is applied from the battery 7 between the electrodes 61a, 61b, the catalyst carrier 61 becomes a resistance, thereby generating heat. As a result, the temperature (bed temperature) of the catalyst rises. For example, in cases where the internal combustion engine 1 is caused to perform a cold start, when a battery voltage is applied across the electrodes 61a, 61b, it becomes possible to activate the catalyst supported by the catalyst carrier 61 at an early stage. In addition, when the battery voltage is applied across the electrodes 61a, 61b with the internal combustion engine 1 being in a deceleration fuel cut-off operating state, it is also possible to suppress a temperature drop of the catalyst supported by the catalyst carrier 61.

Incidentally, in the EHC 6, the water condensed at the upstream side of the catalyst carrier 61 may soak into the mat member 63 or the catalyst carrier 61. In addition, when the temperature of the EHC 6 is low, the moisture in the exhaust gas may condense in the mat member 63 and the catalyst carrier 61. The thus condensed water permeates into the through-holes 63a, 63b through gaps between the fibers in the mat member 63, or through the fine pores in the catalyst carrier 61. Moreover, when the exhaust gas in the case 62 permeates into the through-holes 63a, 63b through the mat member 63 and the catalyst carrier 61 at the time the temperature of the EHC 6 is low, the moisture in the exhaust gas may condense in the insides of the through-holes 63a, 63b.

In cases where a relatively large amount of condensed water is accumulated in the insides of the through-holes 63a, 63b, as stated above, when the EHC 6 rises in temperature, the condensed water may vaporize (evaporate) thereby to lower the insulation resistances inside the through-holes 63a, 63b. The lowering of the insulation resistances inside the through-holes 63a, 63b may cause the electrodes 61a, 61b and the case 62 to be short-circuited to each other.

On the other hand, the EHC 6 of this embodiment is constructed such that it is provided with a pressure supply unit for applying a positive pressure to the insides of the through-holes 63a, 63b. The pressure supply unit of this embodiment is provided with air pumps 67 that are operated to discharge high pressure airs (airs of positive pressure), and pressure pipes 66a, 66b that serve to guide the high pressure airs discharged from the air pumps 67 to the through-holes 63a, 63b, respectively. The air pumps 67 are each an electromotive pump which is operated by making use of the electric power of the battery 7, and are controlled by means of the ECU 10. Here, note that in the example shown in FIG. 2, the two air pumps 67 are illustrated, but the high pressure air discharged from a single air pump 67 may be distributed to the two pressure pipes 66a, 66b.

According to the EHC 6 as constructed in this manner, the high pressure airs are supplied to the through-holes 63a, 63b from the air pumps 67, respectively. In that case, the discharge pressure of each of the air pumps 67 is set to be larger than a maximum value which the exhaust gas pressure inside the case 62 can take during the operation of the internal combustion engine 1. When the air pumps 67 are driven to operate in this manner, the internal pressures of the through-holes 63a, 63b become higher than the exhaust gas pressure in the case 62. As a result, it is possible to avoid a situation where the condensed water staying in the mat member 63 or the catalyst carrier 61 permeates into the through-holes 63a, 63b, and a situation where the exhaust gas inside the case 62 permeates into the through-holes 63a, 63b through the mat member 63 or the catalyst carrier 61.

As a result, the phenomenon that the moisture in the exhaust gas condenses inside the through-holes 63a, 63b, and the phenomenon that condensed water permeates into the insides of the through-holes 63a, 63b, do not occur. Accordingly, there is no short circuit between the electrodes 61a, 61b and the case 62 due to the lowering of the insulation resistances inside the through-holes 63a, 63b.

Here, note that if the air pumps 67 are always forced to operate at the time of operation of the internal combustion engine 1, there will be a possibility that a deterioration in the specific fuel consumption (fuel consumption rate) accompanying an increase in the amount of consumption of battery power may be caused, and at the same time a possibility that a reduction in the durability of the air pumps 67 may be caused. Accordingly, the ECU 10 may control the air pumps 67 so as to operate them only in cases where there is a possibility that condensed water may stay or may be generated inside the through-holes 63a, 63b.

As a case where condensed water stays or is generated in the insides of the through-holes 63a, 63b, it can be considered that the temperatures inside the through-holes 63a, 63b become equal to or lower than the dew point temperature of air. Therefore, the air pumps 67 may be made to operate only in cases where the temperatures inside the through-holes 63a, 63b become equal to or lower than the dew point temperature of air.

Here, the temperatures inside the through-holes 63a, 63b may be detected by the provision of a temperature sensor(s) for exclusive use, or the output signal of the downstream side temperature sensor 14 may be used as an alternative value for such temperatures. The dew point temperature may be measured by a dew point meter such as a polymer membrane dew point meter, a mirror surface cooling type dew point meter, a quarts oscillator dew point meter, a lithium chloride dew point meter, etc., or may be calculated by the use of a flow rate of the exhaust gas (an amount of intake air), an amount of fuel injection, etc., as an argument.

The ECU 10 controls the battery 7 so as to supply electric power therefrom to the air pumps 67 in cases where the temperatures inside the through-holes 63a, 63b are equal to or lower than the dew point temperature. On the other hand, the ECU 10 controls to stop the supply of electric power from the battery 7 to the air pumps 67 in cases where the temperatures inside the through-holes 63a, 63b are higher than the dew point temperature.

When the times of operation of the air pumps 67 are limited in this manner, it is possible to shorten the operating times of the air pumps 67, while avoiding the situation that condensed water stays or is generated in the through-holes 63a, 63b. As a result, the deterioration in the specific fuel consumption and the reduction in the durability of the air pumps 67 can be suppressed.

Here, the control procedure of the air pumps 67 will be explained with reference to FIG. 3. FIG. 3 is a flow chart showing a control routine which the ECU 10 carries out at the time of operating the air pumps 67. This control routine is a routine which has been beforehand stored in a ROM of the ECU 10, etc., and is executed by the ECU 10 in a periodic manner.

Figure 3:
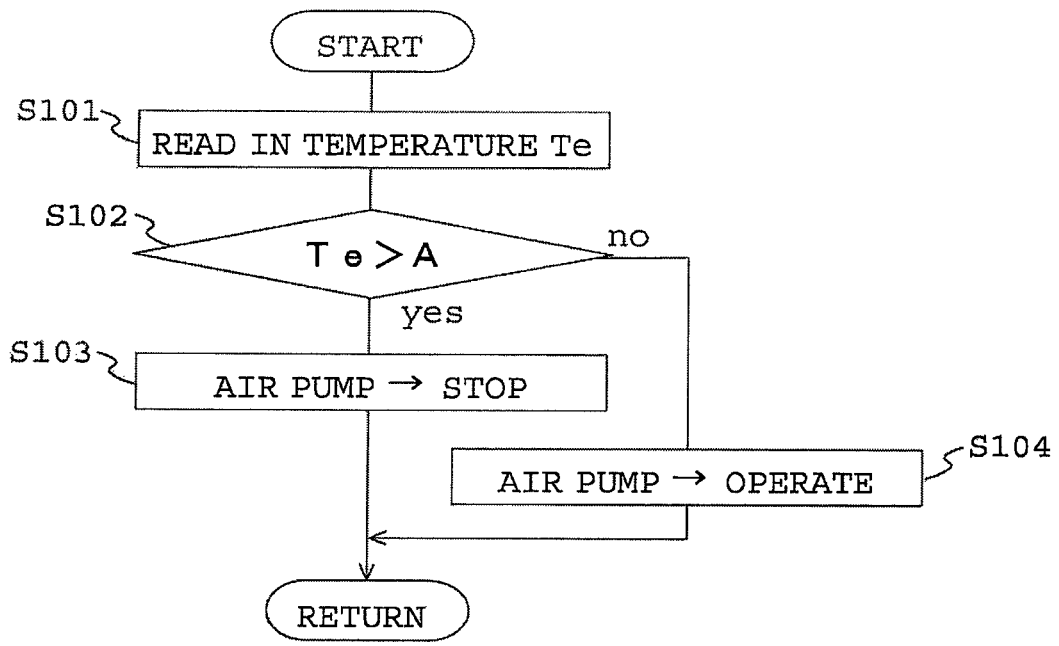
FIG. 3 is a flow chart showing a control routine in a first embodiment.

In the control routine of FIG. 3, first in S101, the ECU 10 reads in temperatures Te inside the through-holes 63a, 63b. Here, it is assumed that the output signal of the downstream side temperature sensor 14 is used as the temperatures Te inside the through-holes 63a, 63b.

In S102, the ECU 10 determines whether the temperatures Te thus read in the above-mentioned step S101 are higher than a dew point temperature A. In cases where an affirmative determination is made in S102 (Te>A), the ECU 10 proceeds to S103. In S103, the ECU 10 stops the operations of the air pumps 67. That is, the ECU 10 stops the supply of electric power from the battery 7 to the air pumps 67. In that case, a part of the exhaust gas in the case 62 permeates into the insides of the through-holes 63a, 63b through the mat member 63 and/or the catalyst carrier 61. However, because the temperatures Te inside the through-holes 63a, 63b are higher than the dew point temperature A, the moisture in the exhaust gas does not condense.

On the other hand, in cases where a negative determination is made in the above-mentioned step S102 (Te≤A), the ECU 10 proceeds to S104. In S104, the ECU 10 causes the air pumps 67 to operate. That is, the ECU 10 controls such that electric power is made to be supplied from the battery 7 to the air pumps 67. The amount of electric power to be supplied in that case is set in such a manner that the pressures inside the through-holes 63a, 63b become higher than the exhaust gas pressure inside the case 62. When the air pumps 67 are caused to operate in this manner, a part of the exhaust gas in the case 62 does not permeate into the insides of the through-holes 63a, 63b through the mat member 63 or the catalyst carrier 61. Moreover, the condensed water staying in the mat member 63 and/or the catalyst carrier 61 is also prevented from permeating into the insides of the through-holes 63a, 63b. As a result, the situation where a lot of condensed water stays in the insides of the through-holes 63a, 63b is avoided.

By the ECU 10 executing the control routine shown in FIG. 3 in this manner, it becomes possible to avoid the situation where the condensed water stays in the insides of the through-holes 63a, 63b, without operating the air pumps 67 in an unnecessary manner.

Although in this embodiment, there has been described an example in which only the mat member 63 is arranged between the outer peripheral surface of the catalyst carrier 61 and the inner peripheral surface of the case 62, a laminated body composed of a mat member and an electrical insulation layer may be arranged between the outer peripheral surface of the catalyst carrier 61 and the inner peripheral surface of the case 62.

Figure 4:
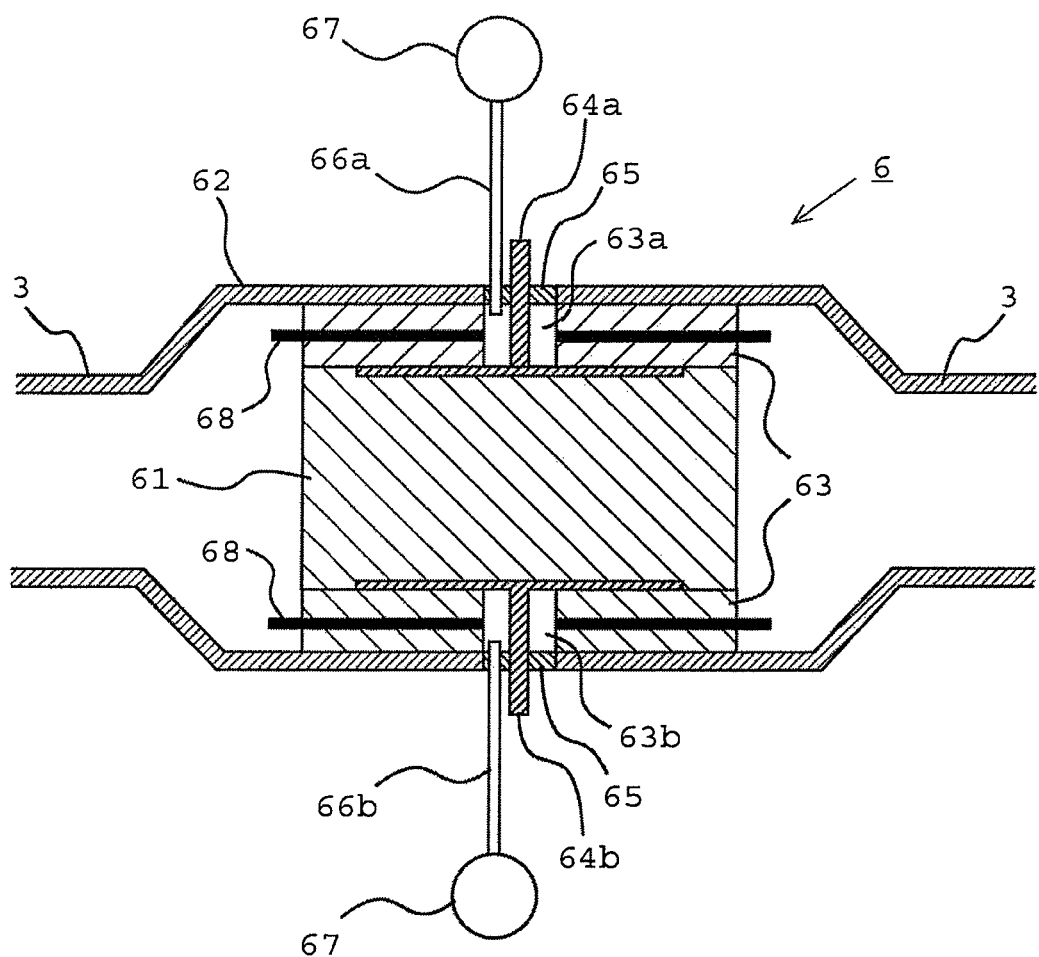
FIG. 4 is a view showing another construction example of an EHC.

For example, the EHC 6 shown in FIG. 4 has an inner cylinder (electrical insulation layer) 68 of a circular cylindrical shape which is arranged between the case 62 and the catalyst carrier 61. The inner cylinder 68 is formed of an insulating member such as alumina. The mat member 63 is press fitted in a gap between the inner peripheral surface of the case 62 and the outer peripheral surface of the inner cylinder 68, as well as in a gap between the inner peripheral surface of the inner cylinder 68, and the outer peripheral surface of the catalyst carrier 61. According to the EHC 6 as constructed in this manner, it is possible to avoid the situation that in cases where condensed water is accumulated in the mat member 63, the electrodes 61a, 61b and the case 62 are short-circuited to each other through the condensed water thus accumulated.

Figure 2:
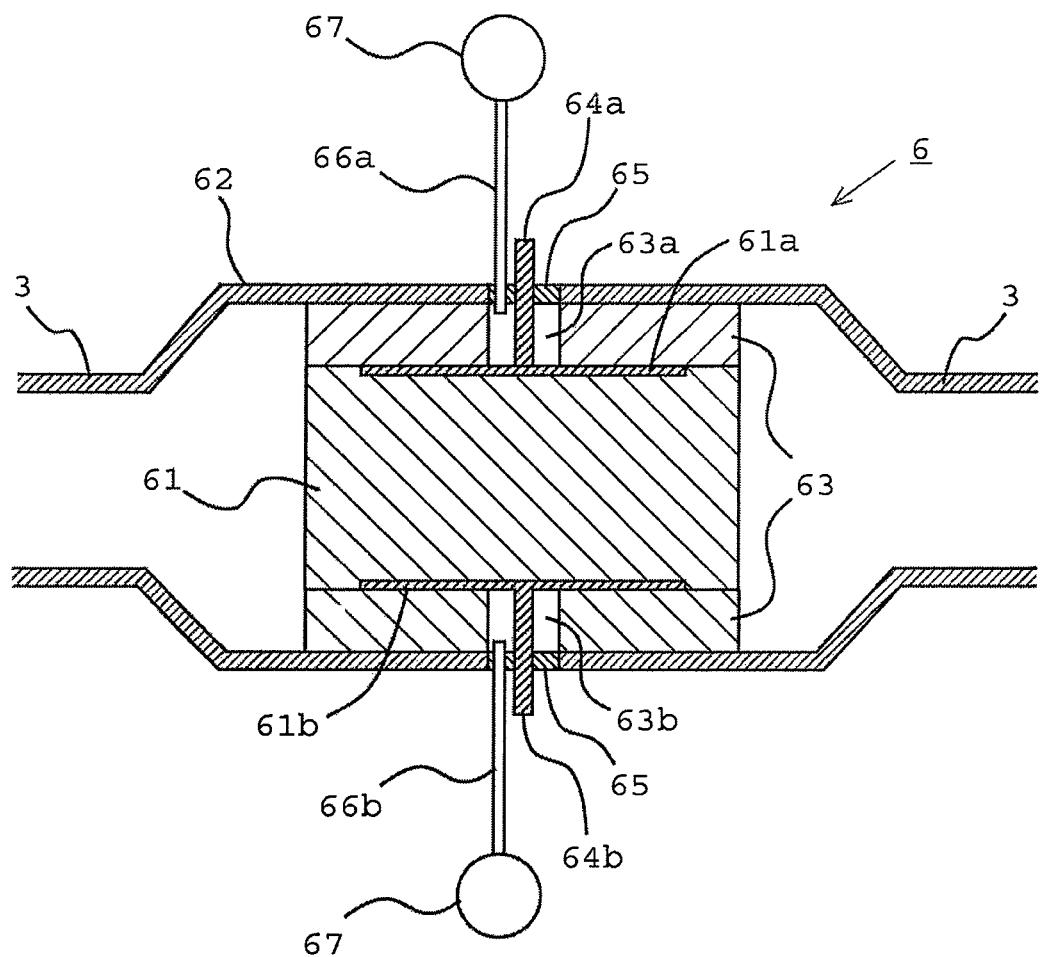
FIG. 2 is a cross sectional view showing the schematic construction of an EHC.

However, in comparison with the construction shown in FIG. 2 as stated above, a lot of condensed water is liable to accumulate in the mat member 63 between the inner cylinder 68 and the case 62. For this reason, there is a possibility that the lot of condensed water may permeate into the through-holes 63a, 63b from the mat member 63 between the inner cylinder 68 and the case 62. To cope with this, by supplying high pressure airs to the through-holes 63a, 63b from the air pumps 67, it is possible to avoid the situation that the condensed water accumulated in the mat member 63 permeates into the through-holes 63a, 63b.

(Second Embodiment)

Next, reference will be made to a second embodiment of the present invention based on FIG. 5. Here, a construction different from that of the above-mentioned first embodiment will be described, and an explanation of the same construction will be omitted.

The point of difference of this embodiment from the above-mentioned first embodiment is that the present invention is applied to a system in which air fuel ratio feedback control based on the output signal of the air fuel ratio sensor 11 and sub feedback control based on the output signal of the $O_2$ sensor 13 are carried out.

In this second embodiment, the ECU 10 executes the air fuel ratio feedback control (main feedback control) to correct an amount of fuel injection in such a manner that the output signal of the air fuel ratio sensor 11 is converged into a target value. Further, the ECU 10 executes the sub feedback control to calculate a correction value and a learning value used in the air fuel ratio feedback control, by the use of the output signal of the $O_2$ sensor 13 as an argument.

Incidentally, when high pressure airs are supplied to the through-holes 63a, 63b from the air pumps 67, respectively, a part of the high pressure airs passes through the mat member 63 and the catalyst carrier 61, so that it mixes into the exhaust gas inside the case 62. As a result, the oxygen concentration of the exhaust gas which flows out of the EHC 6 becomes higher than the oxygen concentration of the exhaust gas which flows into the EHC 6, as a consequence of which the output signal of the $O_2$ sensor 13 becomes higher than the oxygen concentration of the exhaust gas which flows into the EHC 6 (i.e., it shifts to a lean side).

Therefore, when the sub feedback control based on the output signal of the $O_2$ sensor 13 is executed during the operations of the air pumps 67, the correction value and the learning value used for the air fuel ratio feedback control become inappropriate values. As a result, the amount of fuel to be injected may become more than an appropriate amount, thus giving rise to a possibility that the air fuel ratio of the exhaust gas flowing into the EHC 6 may shift to a rich side from the target value. When the air fuel ratio of the exhaust gas flowing into the EHC 6 becomes richer than the target value, there is also a possibility that it may become impossible to exhibit the purification ability of the catalyst supported by the catalyst carrier 61 to a sufficient extent.

Accordingly, in this embodiment, the ECU 10 is configured to prohibit the execution of the sub feedback control during the operations of the air pumps 67. When the execution of the sub feedback control is prohibited during the operations of the air pumps 67, it is possible to avoid the situation that the correction value and the learning value used for the air fuel ratio feedback control become inappropriate values. As a result, it is also possible to avoid the situation that the air fuel ratio of the exhaust gas flowing into the EHC 6 becomes richer than the target value.

In the following, the control executed by the ECU 10 in this embodiment will be explained with reference to FIG. 5. FIG. 5 is a flow chart showing a control routine which the ECU 10 carries out at the time of operating the air pumps 67. In FIG. 5, the same symbols are attached to the same processes as those in the above-mentioned control routine of the first embodiment (see FIG. 3).

Figure 5:
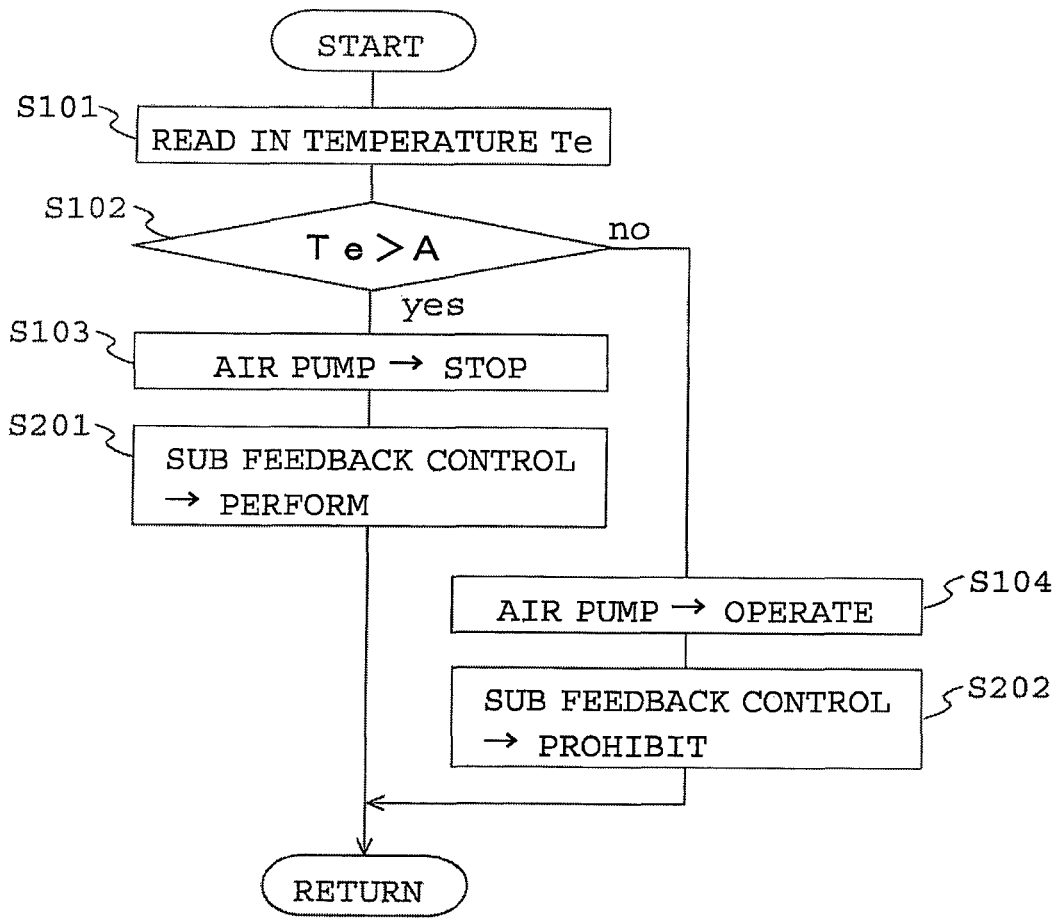
FIG. 5 is a flow chart showing a control routine in a second embodiment.

In the control routine of FIG. 5, in cases where an affirmative determination is made (Te>A) in S102, the ECU 10 carries out the processing of S103 and the processing of S201 in a sequential manner. In S201, the ECU 10 permits the execution of the sub feedback control based on the output signal of the $O_2$ sensor 13.

On the other hand, in cases where a negative determination is made (Te≤A) in S102, the ECU 10 sequentially carries out the processing of S104 and the processing of S202. In S202, the ECU 10 prohibits the execution of the sub feedback control based on the output signal of the $O_2$ sensor 13. Thus, by carrying out the processing of S202 by means of the ECU 10, a prohibition unit according to the present invention is achieved.

According to the second embodiment described above, the execution of the sub feedback control based on the output signal of the $O_2$ sensor 13 is prohibited during the operations of the air pumps 67. As a result, it is possible to avoid the situation that the correction value and the learning value used for the main feedback control become inappropriate values.

Although in this second embodiment, there has been described an example in which the execution of the sub feedback control based on the output signal of the $O_2$ sensor 13 is prohibited during the operations of the air pumps 67, the execution of the sub feedback control may be permitted during the operations of the air pumps 67 after the output signal of the $O_2$ sensor 13 is corrected to a value of the rich side.

(Third Embodiment)

Now, reference will be made to a third embodiment of the present invention based on FIGS. 6 and 7. Here, a construction different from that of the above-mentioned second embodiment will be described, and an explanation of the same construction will be omitted.

When the point of difference of this third embodiment from the above-mentioned first embodiment is that at the time of operating the air pumps 67, the amount of current applied to the air pumps 67 is controlled in such a manner that the pressures inside the through-holes 63a, 63b become equivalent to the exhaust gas pressure inside the case 62.

When the pressures inside the through-holes 63a, 63b become higher than the exhaust gas pressure inside the case 62 at the time the air pumps 67 are caused to operate, a part of airs introduced into the insides of the through-holes 63a, 63b mixes into the exhaust gas. On the other hand, when the pressures inside the through-holes 63a, 63b become equivalent to the exhaust gas pressure inside the case 62, the airs introduced into the insides of the through-holes 63a, 63b do not pass through the mat member 63 and/or the catalyst carrier 61, and hence do not mix into the exhaust gas. As a result, it is possible to avoid the situation that the output signal of the $O_2$ sensor 13 shifts to the lean side.

In the following, the control executed by the ECU 10 in this embodiment will be explained with reference to FIG. 6. FIG. 6 is a flow chart showing a control routine which the ECU 10 carries out at the time of operating the air pumps 67. In FIG. 6, the same symbols are attached to the same processes as those in the above-mentioned control routine of the first embodiment (see FIG. 3).

Figure 6:
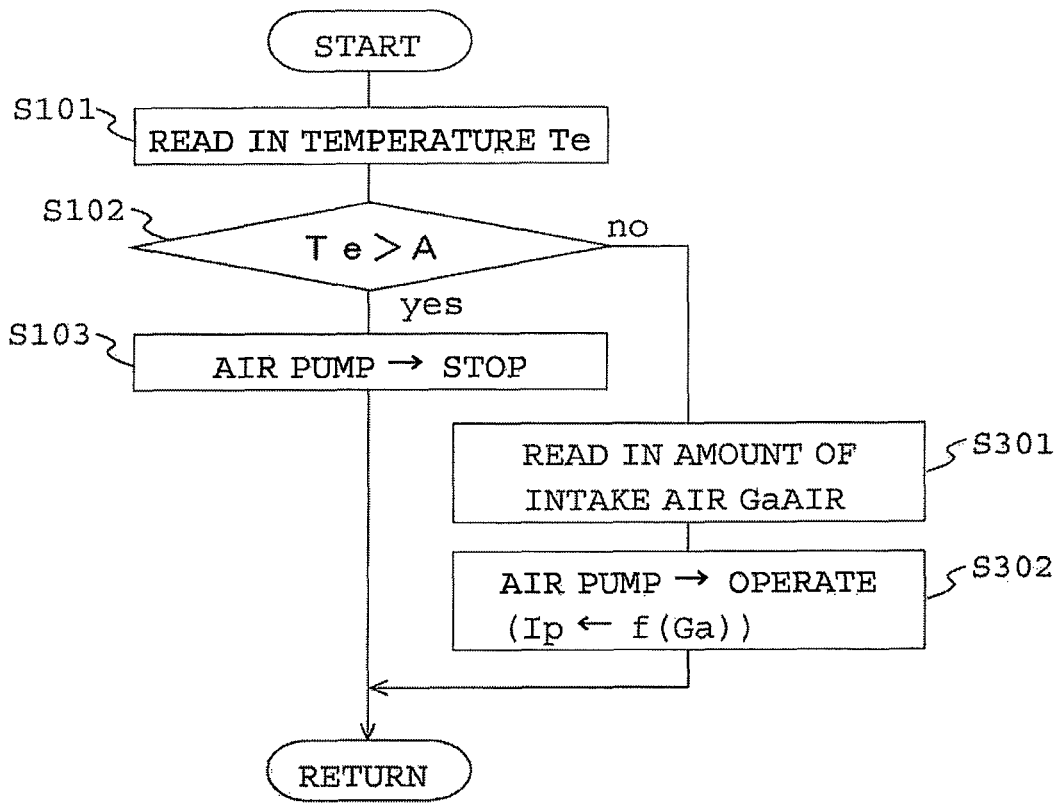
FIG. 6 is a flow chart showing a control routine in a third embodiment.
Figure 7:
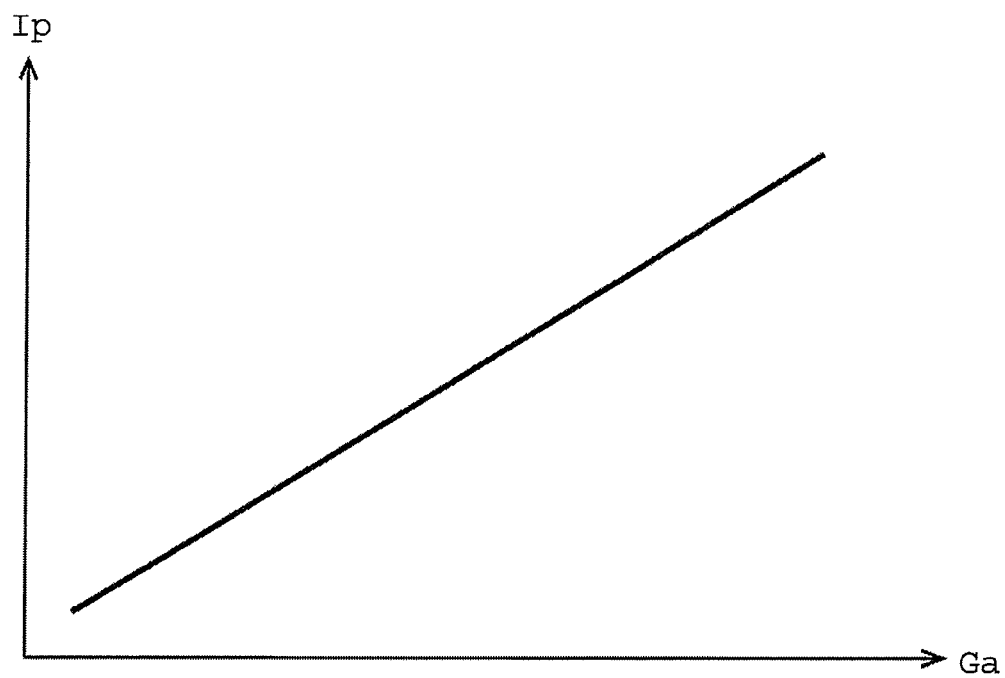
FIG. 7 is a view schematically showing a map which defines the relation between an amount of applied current Ip and an amount of intake air Ga of an air pump.

In the control routine of FIG. 6, in cases where a negative determination is made (Te≤A) in S102, the ECU 10 sequentially carries out the processing of S301 and the processing of S302. First in S301, the ECU 10 reads in an output signal (an amount of intake air) Ga of the air flow meter 4.

Then, in S302, the ECU 10 decides an amount of current Ip (=f(Ga)) to be applied to the air pumps 67 by using as a parameter the amount of intake air Ga read in the above-mentioned step S301, and controls to supply the amount of applied current Ip thus decided from the battery 7 to the air pumps 67.

Here, the exhaust gas pressure inside the case 62 is correlated with the amount of intake air Ga in the internal combustion engine 1. That is, the exhaust gas pressure inside the case 62 becomes higher when the amount of intake air Ga is large than when the amount of intake air Ga is small. Accordingly, the ECU 10 calculates the amount of current Ip to be applied to the air pumps 67 based on a map as shown in FIG. 7 and the amount of intake air Ga. The map shown in FIG. 7 is a map which defines the relation between the amount of intake air Ga and the amount of applied current Ip, and is beforehand obtained by the adaptation or suitability processing which makes use of experiments, etc.

When the amount of current Ip to be applied to the air pumps 67 is decided according to the above-mentioned method, it is possible to make the pressures inside the through-holes 63a, 63b equivalent to the exhaust gas pressure inside the case 62. As a result, the air pumps 67 can be caused to operate while avoiding the situation that the output signal of the $O_2$ sensor 13 shifts to the lean side. Therefore, even in cases where the air pumps 67 are caused to operated, it is possible to carry out the sub feedback control based on the output signal of the $O_2$ sensor 13.

Although in this embodiment, there has been described an example in which the discharge pressure (the amount of applied current Ip) of each of the air pumps 67 is decided by using as a parameter the amount of intake air Ga in the internal combustion engine 1, a pressure sensor for detecting the pressure inside the case 62 may be attached to the EHC 6, so that the discharge pressure (the amount of applied current Ip) of each of the air pumps 67 may be decided by using a parameter an output signal of the pressure sensor.

DESCRIPTION OF THE REFERENCE NUMERALS AND SYMBOLS 1 internal combustion engine
2 intake passage
3 exhaust passage
4 air flow meter
5 intake throttle valve
6 EHC
7 battery
10 ECU
11 air fuel ratio sensor
12 upstream side temperature sensor
13 $O_2$ sensor
14 downstream side temperature sensor
61 catalyst carrier
61a, 61b electrodes
62 case
63 mat member
63a, 63b through-holes
64a, 64b electrode terminals
65 support member
66a, 66b pressure pipes
67 air pump
68 inner cylinder

The invention claimed is:

1. An exhaust gas purification apparatus of an internal combustion engine comprising:
    a catalyst carrier that is provided with electrodes;
    a case that has said catalyst carrier accommodated therein;
    a mat member that is arranged between said catalyst carrier and said case;
    a through-hole that extends from said catalyst carrier to said case while passing through said mat member;
    electrode terminals that are accommodated in said through-hole for supplying electric power to said electrodes; and
    an air pump that discharges air having a positive pressure;

a pressure pipe that serves to guide only the air discharged from said air pump to said through-hole;

an electronic control unit that controls said air pump in such a manner that a discharge pressure of said air pump is equal to or larger than an exhaust gas pressure inside said case.

2. The exhaust gas purification apparatus of an internal combustion engine according to claim 1, further comprising an acquisition unit that acquires a physical quantity correlated with a temperature of said through-hole, wherein said electronic control unit causes said air pump to operate and controls said air pump in such a manner that, the discharge pressure of said air pump is equal to or larger than the exhaust gas pressure inside said case, when the temperature acquired by said acquisition unit is equal to or lower than a dew point temperature.

3. The exhaust gas purification apparatus of an internal combustion engine according to claim 1, further comprising:

an oxygen concentration sensor that is arranged on an exhaust passage at a downstream side of said catalyst carrier;

a calculation unit that calculates a control parameter of the internal combustion engine by using an output signal of said oxygen concentration sensor; and a prohibition unit that prohibits the calculation of said control parameter by said calculation unit when the air is applied from said air pump to said through-hole.

4. The exhaust gas purification apparatus of an internal combustion engine according to claim 1, wherein electronic control unit controls said air pump in such a manner that the discharge pressure of said air pump is equal to the exhaust gas pressure inside said case.

5. The exhaust gas purification apparatus of an internal combustion engine according to claim 4, wherein said electronic control unit makes the discharge pressure of said air pump higher when an amount of intake air in the internal combustion engine is large than when the amount of intake air in the internal combustion engine is small.

* * * * *